Patented June 18, 1940

2,205,337

UNITED STATES PATENT OFFICE 2,205,337

REACTION PRODUCTS OF ORTHO-PHOS-PHITOBENZOYL CHLORIDE AND METHOD OF MAKING SAME

Henry G. Berger, Woodbury, William H. James, Wenonah, and Darwin E. Badertscher, Woodbury, N. J., assignors to Socony-Vacuum Oil Company, Incorporated, New York, N. Y., a corporation of New York No Drawing. Application December 15, 1938, Serial No. 245,914

15 Claims. (Cl. 260—461)

This invention has as its primary object the production of novel compounds or compositions of matter which are soluble in viscous mineral oil fractions and which possess the multifunctional property of improving the pour point and inhibiting the oxidation of such a mineral oil fraction when admixed therewith in minor proportions.

Although the compounds or compositions contemplated herein have been developed in connection with the petroleum industry for the purpose of satisfying a need therein, it is to be understood that these compositions may find numerous other applications, such as intermediaries in the production of plastics, etc. The present invention is directed to these compounds or compositions per se and is to be considered independently of mineral oil compositions containing same, such mineral oil compositions having been made the subject matter of our copending application Serial Number 241,162, filed November 18, 1938, now Patent No. 2,177,923.

The compounds contemplated by this invention are typified by the reaction product of a hydroxyaromatic hydrocarbon which has been substituted with heavy alkyl groups (hereinafter referred to as "wax" groups) and an organic phosphorus and chlorine compound identified in the literature as "ortho-phosphitobenzoyl chloride." This reaction, the details of which will be hereinafter discussed in greater detail, is attended with the evolution of HCl, and the reaction product is a complex compound or mixture of closely related complex compounds characterized by the presence of a wax-substituted mono- or poly- cyclic aryl nucleus, phosphorus, oxygen and a monocyclic aryl nucleus which may or may not carry other substituents such as alkyl groups.

The first reactant referred to above as a wax-substituted hydroxyaromatic compound can be obtained by the condensation in the presence of a Friedel-Crafts catalyst of a halogenated heavy aliphatic hydrocarbon (characterized by long chains having at least twenty carbon atoms) with a hydroxyaromatic compound (mono- or poly-cyclic, mono- or poly- hydric and substituted or unsubstituted). Preferably, the halogenated aliphatic hydrocarbon is a chlorinated high molecular weight aliphatic compound or mixture of such compounds providing a source of "heavy alkyl groups" of the type characteristic of the heavier products of petroleum, special preference being given to a petroleum wax predominantly comprised of hydrocarbons having at least twenty carbon atoms as a source of the chlorinated aliphatic material.

The hydroxyaromatic compounds which are condensed with the aliphatic material in the Friedel-Crafts reaction to obtain the first reactant mentioned above may be represented, for the most part, by the following formulae:

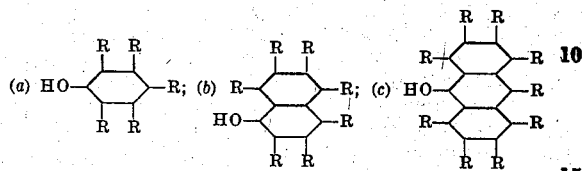

wherein at least one R represents hydrogen and the remaining R's are radicals chosen from the group consisting of hydrogen, hydroxy, alkyl, aryl, aralkyl, alkaryl, aroxy and alkoxy radicals. In general it is preferred to use those compounds wherein the R's are selected from the group consisting of hydrogen and hydroxy and within this group preference is had for compounds of the single ring type (a), the preferred specific compound being phenol (mono hydroxybenzene). Other compounds which may be found useful in preparing the "first reactant" are benzyl phenol, resorcinol, o-hydroxydiphenyl, beta-naphthol, p-cresol, hydroquinone, methyl naphthol, benzyl naphthol, anthranol and the like.

As is well known to those familiar with the art, compounds of the type illustrated by general formulae above have isomers typified by the formulae

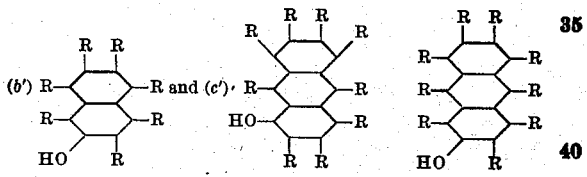

and it is to be understood that where structural formulae of the types first illustrated hereinabove are used herein, it is our intention to include under such formulae and related formulae the various isomers of the particular compound or compounds typified by the formula or formulae.

The second reactant used in synthesizing our novel compounds or compositions of matter has been generally referred to herein as "ortho-phosphitobenzoyl chloride" and can be obtained by reacting phosphorus trichloride with ortho-hydroxy-benzoic acid (salicylic acid) or alkyl substituted, aryl substituted, or aralkyl substituted ortho-hydroxybenzoic acid in substantially equimolar proportions. This reaction is continued preferably at a temperature slightly above atmospheric until the evolution of hydrochloric acid has substantially ceased and may be illustrated (using unsubstituted salicylic acid) by the following equation:

I.
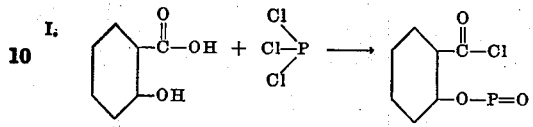

The class or group of compounds contemplated herein as the second reactant, taking into consideration the alternative of using a substituted salicylic acid in the reaction of Equation I may be represented by the following general formula:

II.
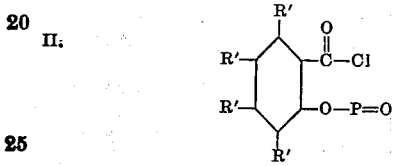

in which R' represents hydrogen, alkyl, aryl or aralkyl radicals.

In obtaining the final compound or composition from the two reactants described above, the wax-hydroxyaromatic compound and the "ortho-phosphitobenzoyl chloride" compound are reacted together in substantially equi-molar proportions, or in the case of the polyhydroxy phenolic compounds (one or more R's in general formulae a, b, or c being hydroxy) the proportions may be such that the phosphito reactant is equivalent to the hydroxy content of the wax-hydroxy-aromatic compound or complex, at elevated temperature until the evolution of hydrochloric acid has substantially ceased after which the reaction mixture is water-washed to obtain the final product. This reaction may be illustrated by the following equation:

III.
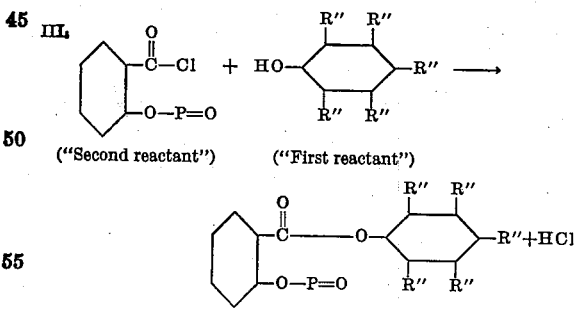
("Second reactant")    ("First reactant")

in which at least one of the R'''s represents a heavy alkyl radical (preferably an aliphatic hydrocarbon radical containing at least twenty carbon atoms) corresponding to those which characterize petroleum wax, the remaining R'''s being selected from the group consisting of hydrogen, hydroxyl, aryl, alkyl, aralkyl, aroxy and alkoxy radicals. It is possible that two OH groups have hydrated the phosphorus atom in the water-washing step, in which event the formula of the product of Equation III becomes:

IV.
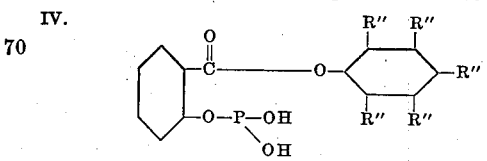

It is to be understood that a general formula for a series of reaction products of the type discussed above involves a degree of uncertainty and we therefore do not wish to be bound by any theory as to the molecular composition or exact chemical name of the product or products contemplated herein, but for the purpose of clarity of description, these compounds or compositions may be represented by the following general formula V.
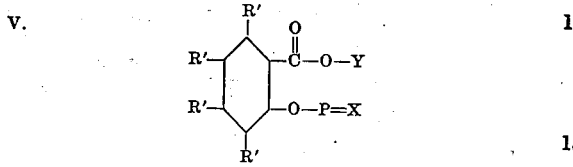

wherein the benzene ring, P, C, and O have their usual chemical significance; R' has the same significance defined above; X represents an oxygen atom or two OH radicals attached to P, and Y represents a radical selected from the group which with their isomeric compounds can be represented by the following general formulae:

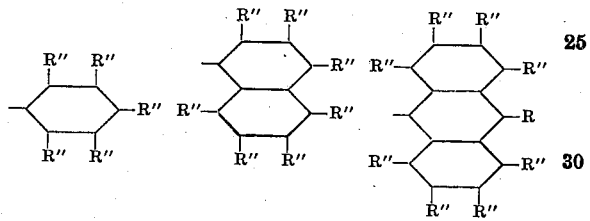

wherein R'' has the same significance defined above. In addition to this illustrative formula we have arbitrarily designated products of this general type by the name "alkylated aryl ortho-phosphitobenzoates," or more specifically as "wax-aryl ortho-phosphitobenzoates."

The details in a procedure which may be conveniently followed in synthesizing compounds or compositions of matter of the type contemplated herein, will be best appreciated from the following examples:

PREPARATION OF "WAX-PHENYL ORTHO-PHOSPHITO-BENZOATE"

A. Wax-phenol (first reactant)

A crystalline petroleum wax having a melting point of about 130° F. was chlorinated by heating the wax to about 200° F. and bubbling chlorine gas through the molten wax until the weight of the wax had been increased about 14% by condensation with chlorine; the wax-chlorine composition thus obtained corresponded substantially to a mono- or a mixture of mono- and di-chlor wax. The heavy alkyl or wax substituted phenol is formed by reacting the chlorwax and phenol mixed together in suitable proportions of say 1 mol of phenol to a quantity of chlorwax containing from one to four atomic proportions of chlorine. These proportions may be varied, but it is preferable in all cases that the proportion be such that there is not more than one molecular proportion of phenol per atomic proportion, otherwise the product would contain unsubstituted phenol, which is undesirable. The reaction is carried out by heating the chlorwax phenol mixture to a temperature of from about 120° F. to about 150° F. and then adding a Friedel-Crafts catalyst (aluminum chloride) in an amount corresponding to from 2% to 10% of the weight of the chlorwax. The temperature is then slowly raised to about 250°–350° F. until completion of the reaction is indicated by substantial cessation of HCl evolution.

This product may be water-washed to remove the aluminum chloride, but we consider it preferable to use the wax-phenol-aluminum chloride complex as one of the reactants to be used in obtaining our final product.

The degree of wax substitution in the final product may be varied by varying the proportions of phenol (hydroxy-aromatic compound) and chlorwax used in the above reaction. The product derived from chlorwax and phenol, which our tests indicate as being preferable for use as an oil improving agent, is obtained by using an amount of chlorwax (14% chlorine content) containing two atomic proportions of chlorine and one molecular proportion of phenol. This product is arbitrarily termed a di-wax phenol. Mono, tri and tetra wax phenol can be obtained by using ratios of one molecular proportion of phenol to a quantity of chlorwax containing one, three and four atomic proportions of chlorine respectively, the chlorwax having a chlorine content in the neighborhood of 14%.

B. Ortho-phosphitobenzoyl chloride (second reactant)

One mole of phosphorus trichloride and one mole of salicylic acid were mixed together in a reaction vessel and the mixture heated gently on the water bath to about 158° F. at which temperature there was a moderate evolution of hydrogen chloride. When this evolution had begun to subside the temperature was raised to about 194° F. to insure completion of the reaction as indicated by substantial cessation of HCl evolution. The product of this reaction (herein referred to as the second reactant) represented by Equation I above, according to the system of nomenclature used by the Chemical Society (London) is termed ortho-phosphitobenzoyl chloride.

C. Final product ("wax-phenyl ortho-phosphitobenzoate")

488 grams (0.5 mole) of the tetrawax phenol-aluminum chloride complex of step A above was melted by heating to about 122° F. in a reaction vessel and 101 grams (0.5 mole) of ortho-phosphitobenzoyl chloride was added thereto at one time. The temperature of the reaction mixture was raised, by the application of external heat, from 122° F. to about 302° F. over a period of about 1½ hours. During this time there was a brisk evolution of hydrogen chloride, and the temperature was held in the neighborhood of 300° F. for another hour to assure completion of the reaction.

A "di-wax" product was also prepared following the same general procedure with a di-wax phenol-aluminum chloride complex.

After this reaction was complete the product was washed with hot water to remove aluminum chloride. It is advantageous in this washing operation to add about two percent of an alcohol, such as amyl alcohol, to the wash water, to decrease the tendency toward emulsification. The product was washed three times with equal volumes of water containing two percent of amyl alcohol after which it was dissolved in benzene and the benzene solution was further washed three times with water-amyl alcohol solution. The benzene was removed by distillation to give the final product which may be termed for purpose of identification, a mono-, di-, tri- or tetra-wax-phenyl (or wax-aryl) ortho-phosphitobenzoate, depending on the extent to which the wax-phenol has been substituted with wax.

Compounds or compositions of the type described above as di-wax phenyl ortho-phosphitobenzoate and tetra-wax phenyl ortho-phosphitobenzoate have been prepared and tested in mineral oil compositions. These compositions have been found to be effective inhibitors of oxidation as indicated by both the motor oil corrosion test and the German tar test. In addition these compounds or compositions are effective, when blended in amounts of from 0.125% to 0.5% with a lubricant fraction having an A. S. T. M. pour point of +20° F., to reduce the pour point to from −5° F. to −30° F.

It is to be understood that while we have herein described certain preferred procedures for synthesizing the products of this invention, have given certain illustrative examples of representative products and have emphasized one particular field of use for these products, the present invention is not confined to the details and examples given in the foregoing description but includes within its scope such changes and modifications as fairly come within the appended claims.

We claim:

1. As a new composition of matter the product obtained by reacting a compound selected from the group having the typical formulae:

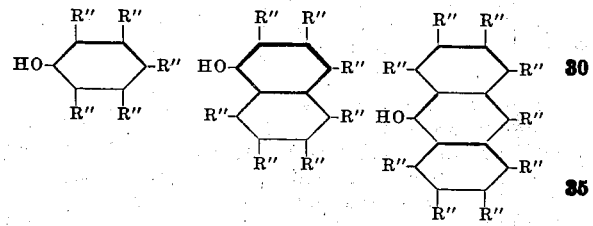

in which at least one of the R'''s represents a high molecular weight aliphatic hydrocarbon radical, the remaining R'''s being selected from the group consisting of hydrogen, hydroxyl, aryl, alkyl, aralkyl, aroxy, and alkoxy radicals, with a compound having the general formula:

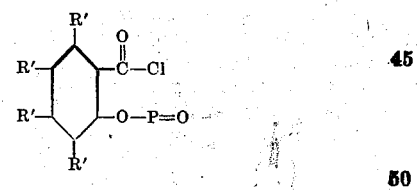

in which the R''s are selected from the group consisting of hydrogen, alkyl, aryl and alkaryl radicals.

2. As a new composition of matter, the product obtained by reacting a compound selected from the group having the general formulae:

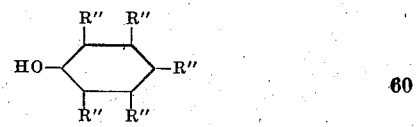

in which at least one of the R'''s represents a high molecular weight aliphatic hydrocarbon radical, the remaining R'''s being selected from the group consisting of hydrogen, hydroxyl, aryl, alkyl, aralkyl, aroxy, and alkoxy radicals, with a compound having the general formula:

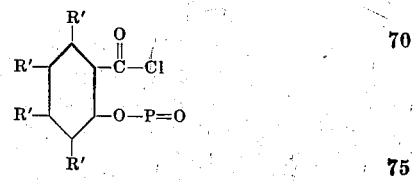

in which the R''s are selected from the group consisting of hydrogen, alkyl, aryl and alkaryl radicals, the final product of said reaction possessing the property of depressing the pour point and inhibiting oxidation of a viscous mineral oil fraction.

3. As a new composition of matter the product obtained by reacting a compound selected from the group having the typical general formulae:

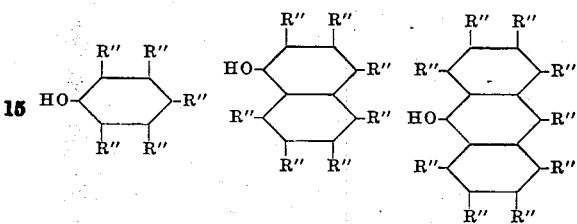

in which at least one of the R'''s represents a high molecular weight aliphatic hydrocarbon radical, the remaining R'''s being selected from the group consisting of hydrogen, hydroxyl, aryl, alkyl, aralkyl, aroxy, and alkoxy radicals, with a compound having the general formula:

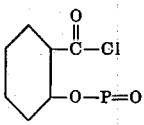

the said reaction being carried out at elevated temperature until the evolution of hydrochloric acid gas has substantially ceased.

4. As a new composition of matter the product obtained by reacting a first reactant having the general formula:

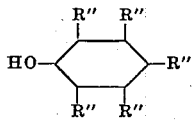

in which at least one of the R'''s represents a high molecular weight aliphatic hydrocarbon radical, the remaining R'''s being selected from the group consisting of hydrogen, hydroxyl, aryl, aralkyl, aroxy and alkoxy radicals, with a second reactant having the general formula:

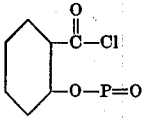

the said reactants being reacted at elevated temperature and in proportions such that the amount of the second reactant present is substantially equivalent to the hydroxyl content of the first reactant.

5. As a new composition of matter, the product obtained by reacting a first reactant selected from the group typified by the general formulae:

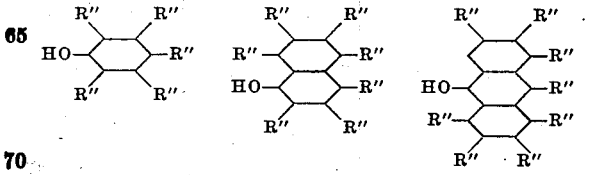

in which at least one of the R'''s represents an aliphatic hydrocarbon radical having at least twenty carbon atoms, the remaining R'''s being selected from the group consisting of hydrogen, hydroxyl, aryl, alkyl, aralkyl, aroxy and alkoxy radicals, with a second reactant having the general formula:

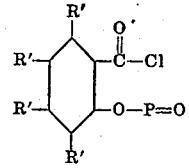

in which the R''s are selected from the group consisting of hydrogen, alkyl, aryl and alkaryl radicals, the said reactants being reacted at elevated temperature until the evolution of HCl has substantially ceased and in proportions such that the amount of the second reactant present is substantially equivalent to the hydroxyl content of the first reactant.

6. As a new composition of matter, the product obtained by reacting the Friedel-Crafts condensation product of a halogenated wax and a hydroxyaromatic compound with the reaction product of phosphorus trichloride and ortho-hydroxybenzoic acid.

7. As a new composition of matter, the product obtained by: reacting phosphorus trichloride with ortho-hydroxybenzoic acid in about equimolar proportions until the evolution of hydrochloric acid has substantially ceased, to obtain one reactant; condensing a hydroxyaromatic hydrocarbon with a halogenated wax in the presence of a Friedel-Crafts catalyst to obtain the other reactant; and reacting the two reactants at elevated temperature until the evolution of hydrochloric acid has substantially ceased, thereafter washing the reaction mixture to obtain the final product.

8. As a new composition of matter, the product obtained by: reacting phosphorus trichloride with ortho-hydroxybenzoic acid in about equimolar proportions until the evolution of hydrochloric acid has substantially ceased, to obtain one reactant; condensing phenol and chlorinated wax in the presence of aluminum chloride at elevated temperature until the evolution of hydrochloric acid has substantially ceased, to obtain the other reactant; and reacting the two reactants at elevated temperature until the evolution of hydrochloric acid has substantially ceased, to obtain the final product.

9. As a new composition of matter, the product obtained by: reacting phosphorus trichloride with ortho hydroxybenzoic acid in substantially equimolar proportions until the evolution of hydrochloric acid has substantially ceased, to obtain one reactant; condensing a member selected from the group consisting of compounds of the general type

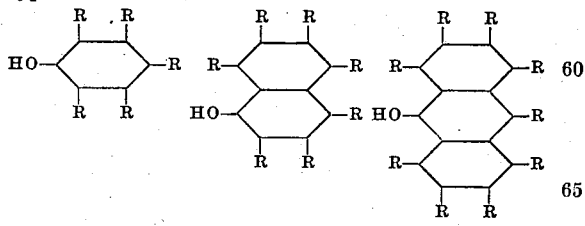

in which R represents radicals selected from the group consisting of hydrogen, hydroxy, alkyl, aryl, aralkyl, aroxy and alkoxy, with chlorinated wax in the presence of aluminum chloride, to obtain the other reactant; reacting the two reactants at elevated temperature until the evolution of hydrochloric acid has substantially ceased; and washing the last mentioned reaction mixture to obtain the final product.

10. As a new composition of matter, the product obtained by reacting a wax substituted hydroxyaromatic compound with o-phosphitobenzoyl chloride until the evolution of hydrochloric acid has substantially ceased.

11. As a new composition of matter, the product obtained by reacting tetra-wax phenol with o-phosphitobenzoyl chloride at elevated temperature until the evolution of hydrochloric acid has substantially ceased.

12. As a new composition of matter, the product obtained by reacting di-wax phenol with o-phosphitobenzoyl chloride at elevated temperature until the evolution of hydrochloric acid has substantially ceased.

13. As a new composition of matter, a compound having the general formula:

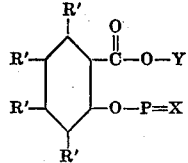

in which: the benzene ring, C, O, and P, have their usual chemical significance, the R''s represent hydrogen, alkyl, aryl, or alkaryl groups; X represents a radical selected from the group consisting of $(OH)_2$ and oxygen; and Y represents a radical selected from the group typified by the following formulae:

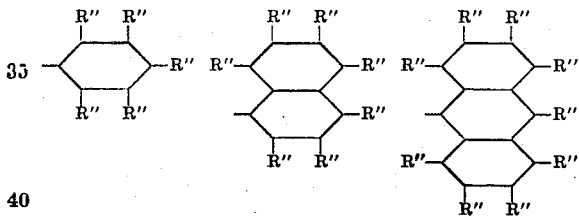

in which at least two of the R'''s represent heavy alkyl radicals corresponding to those which chacacterize petroleum wax, the remaining R'''s being selected from the group consisting of hydrogen, hydroxyl, aryl, alkyl, aralkyl, aroxy and alkoxy radicals.

14. A method for preparing a new mineral oil improving agent which comprises: chlorinating petroleum wax to a chlorine content corresponding to from about a monochlorwax to a dichlorwax; reacting the chlorwax thus obtained with a hydroxyaromatic compound at elevated temperature in the presence of a Freidel-Crafts catalyst, to obtain a first reactant; reacting phosphorus trichloride with a hydroxyaromatic carboxylic acid in about equi-molar proportions at elevated temperature until HCl evolution has substantially ceased, to obtain the second reactant; reacting the first and second reactants at elevated temperature until HCl evolution has substantially ceased and washing the reaction mixture to obtain the final product.

15. The method of preparing a new mineral oil improving agent which comprises: chlorinating petroleum wax to a chlorine content corresponding to from a monochlorwax to a dichlorwax; reacting a quantity of the chlorwax thus obtained containing from one to four atomic proportions of chlorine with not more than one molecular proportion of a phenol per atom of chlorine in the presence of a Freidel-Crafts catalyst and at elevated temperature to obtain a first reactant; reacting salicylic acid with phosphorus trichloride at elevated temperature until HCl evolution has substantially ceased, to obtain a second reactant; reacting the first and second reactants in proportions such that the amount of second reactant present is substantially equivalent to the hydroxyl content of the first reactant at elevated temperature until HCl evolution has substantially ceased and washing the last mentioned reaction mixture to obtain the final product.

HENRY G. BERGER.
WILLIAM H. JAMES.
DARWIN E. BADERTSCHER.